United States Patent
Kash et al.

(10) Patent No.: US 12,434,842 B2
(45) Date of Patent: Oct. 7, 2025

(54) HEADREST WITH DEPLOYABLE OBLIQUE SUPPORTS

(71) Applicant: B/E Aerospace, Inc., Winston-Salem, NC (US)

(72) Inventors: James S. Kash, Winston-Salem, NC (US); Kathryn Elizabeth Doyle, Chinnor (GB); Lawrie Bellwood, London (GB)

(73) Assignee: B/E Aerospace, Inc., Winston-Salem, NC (US)

(*) Notice: Subject to any disclaimer, the term of this patent is extended or adjusted under 35 U.S.C. 154(b) by 187 days.

(21) Appl. No.: 18/381,408

(22) Filed: Oct. 18, 2023

(65) Prior Publication Data

US 2025/0128818 A1    Apr. 24, 2025

(51) Int. Cl.
*B60N 2/885*  (2018.01)
*B64D 11/06*  (2006.01)

(52) U.S. Cl.
CPC ............... *B64D 11/0642* (2014.12)

(58) Field of Classification Search
CPC ............ B64D 11/0642; B60N 2/885; B60N 2002/0208
See application file for complete search history.

(56) References Cited

U.S. PATENT DOCUMENTS

| | | | |
|---|---|---|---|
| 6,250,716 B1 | 6/2001 | Clough | |
| 7,093,903 B2 | 8/2006 | O'Connor et al. | |
| 10,793,040 B2 | 10/2020 | Line et al. | |
| 10,953,988 B2 * | 3/2021 | Canton | B60N 2/885 |
| 2002/0158499 A1 | 10/2002 | Clough | |
| 2006/0255642 A1 * | 11/2006 | Epaud | B60N 2/753 297/411.38 |
| 2012/0299356 A1 | 11/2012 | Edwards | |
| 2013/0221722 A1 | 8/2013 | Navarro et al. | |
| 2015/0329024 A1 | 11/2015 | Szczygiel et al. | |
| 2020/0277060 A1 * | 9/2020 | Canton | B64D 11/0642 |

FOREIGN PATENT DOCUMENTS

DE   102009021267 B4 *  3/2024   ............ B60N 2/865

* cited by examiner

*Primary Examiner* — Philip J Bonzell
(74) *Attorney, Agent, or Firm* — Suiter Swantz IP (57) ABSTRACT

A headrest assembly and an aircraft passenger seat including a headrest assembly. In embodiments, the headrest assembly includes a center portion including left and right lateral receivers each defining an axis of rotation oblique to a plane of the center portion, and left and right ears each including a dogleg support rotatably received in its respective lateral receiver, wherein each ear is configured to rotate independently about its axis of rotation between a stowed position alongside the center portion and a deployed position oblique to the plane of the center portion. In use, for example, the ears may be deployed to provide a provision for sleeping in which the sides of the head are supported.

20 Claims, 11 Drawing Sheets

HEADREST WITH DEPLOYABLE OBLIQUE SUPPORTS

TECHNICAL FIELD AND BACKGROUND

The present disclosure relates generally to an adjustable headrest, and more particularly, to a headrest assembly including left and right supports configured to deploy along a plane oblique to a front of the headrest to provide a provision for supporting the sides of the head.

Seats such as aircraft passenger seats are designed for safety and comfort. Safety typically pertains to the seat frame construction and material performance, while comfort typically pertains to the seat adjustability, ergonomics, cushioning, and climatization.

Headrests are one example of a seat element that provides both comfort and support. For example, a seat may include a separate headrest that serves to center the head with respect to the backrest, provide additional cushioning, and in some cases include a provision for sleeping. While some headrests may be adjustable depending on the user and user preference, adjustability is typically limited to height and/or tilt.

Therefore, what is needed is a headrest with a provision of support that is more configurable to the side of the head.

BRIEF SUMMARY

In one aspect, embodiments of the inventive concepts disclosed herein are directed to a headrest assembly including a base mountable to a seat, a center portion movably coupled to the base, and left and right ears deployable relative to the center portion. In embodiments, the center portion includes left and right lateral receivers each defining an axis of rotation oblique to a plane of the center portion. Each of the left and right ears include a dogleg support rotatably received in their respective lateral receiver such that each ear is configured to rotate about its axis of rotation between a stowed position alongside and in the plane of the center portion, and a deployed position oblique to the plane of the center portion.

In some embodiments, the plane of the center portion is defined by a front of the center portion.

In some embodiments, the center portion is substantially rectangular, the left ear is tapered, and the right ear is tapered.

In some embodiments, the left and right ears converge in a direction of their deployed position and diverge in a direction of their stowed position.

In some embodiments, the left ear rotates independently of the right ear, and vice versa.

In some embodiments, the center portion includes a mounting plate, and each of the left lateral receiver and the right lateral receiver are mounted to a front of the mounting plate.

In some embodiments, the dogleg support of each of the left ear and the right ear include a first portion, a second portion angled relative to the first portion, and a third portion angled relative to the second portion.

In some embodiments, each dogleg support further includes a gusset extending between the second portion and the third portion.

In some embodiments, each of the center portion, the left ear, and the right ear includes a cushion and a cover.

According to another aspect, the present disclosure is directed to an aircraft passenger seat assembly including a passenger seat having a backrest and a headrest assembly mounted to a front of the backrest. In embodiments, the assembly includes a base mountable to a seat, a center portion movably coupled to the base, and left and right ears deployable relative to the center portion. In embodiments, the center portion includes left and right lateral receivers each defining an axis of rotation oblique to a plane of the center portion. Each of the left and right ears include a dogleg support rotatably received in their respective lateral receiver such that each ear is configured to rotate about its axis of rotation between a stowed position alongside and in the plane of the center portion, and a deployed position oblique to the plane of the center portion.

According to a further aspect, the present disclosure is directed to a headrest assembly including a center portion including a left lateral receiver and a right lateral receiver, each of the left and right lateral receivers defining an axis of rotation oblique to a plane defined by a front of the center portion, a left ear including a dogleg support rotatably received in the left lateral receiver, the left ear configured to rotate about the axis of rotation of the left lateral receiver between a stowed position in which the left ear resides in the plane of the center portion, and a deployed position in which the left ear is oblique to the plane of the center portion, and a right ear including a dogleg support rotatably received in the right lateral receiver, the right ear configured to rotate about the axis of rotation of the right lateral receiver between a stowed position in which the right ear resides in the plane of the center portion, and a deployed position in which the right ear is oblique to the plane of the center portion.

In some embodiments, when each of the left ear and the right ear are in their respective stowed position, a top of the left ear and a top of the right ear align with a top of the center portion, and a bottom of the left ear and a bottom of the right ear align with a bottom of the center portion.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a headrest assembly for use with a passenger seat, for instance mounted to the front of a backrest of an aircraft passenger seat. In use, the headrest may be adjusted up and down, as well as portions of the headrest may be moved between stowed and deployed position. Portions of the headrest are deployable, independently, to maximize configurability for the user and provide a provision for supporting the left and right sides of the head. In embodiments, the headrest assembly includes a center portion providing vertical adjustment capability (e.g., up and down motion), and left and ride side portions or 'ears,' configured to selectively rotate between stowed and deployed positions. When stowed, the left and right side portions reside substantially in a plane of the center portion. When deployed the left and right ears rotate about an axis of rotation oblique to the plane of the center portion such that the left and right side portions rotate simultaneously down and inward. In a non-limiting application, the headrest assembly may be utilized on an aircraft passenger seat to facilitate greater comfort on long range and premium sectors through the provision of support that is more configurable to the sides of the head.

FIGS. 1-8 illustrate various perspective, front, back, top, side, etc. views of the headrest assembly 100 according to embodiments of the present disclosure. The headrest assembly 100 generally includes a fixed base 102 for mounting to a seat, a center portion 104 movably coupled to the fixed base 102, a left ear 106 rotatably coupled to the center portion 104, and a right ear 108 rotatably coupled to the center portion 104. The center portion 104 is positioned between the left ear 106 and the right 108. Each ear 106, 108 when stowed is positioned alongside its respective side of the center portion 104. When both ears 106, 108 are stowed, the left ear 106, the center portion 104, and the right ear 108 align substantially in the same place.

In use, the center portion 102 interacts with the fixed base 102 to change the height of the headrest, and the left and right ears 106, 108 interact with the center portion 104 to provide support provisions for the side of the head. In embodiments, the height adjustment capability of the headrest is separate from the deployment of the independently deployable left and right ears 106, 108. As such, various combinations of height adjustments and rotational adjustments of the ears 106, 108 can be used to configure the headrest assembly according to the physical dimensions and/or preference of the user.

In embodiments, the fixed base 102 may be attached to the front of a seat backrest using a plurality of fasteners receivable through the fixed base 102 and into backrest structure. The center portion 104 is height adjustable relative to the fixed base 102. In some embodiments, the center portion 104 is slidably coupled to the fixed base 102, for instance configured to slide up and down by way of a slide mechanism or guide rollers 110.

Figure 1:
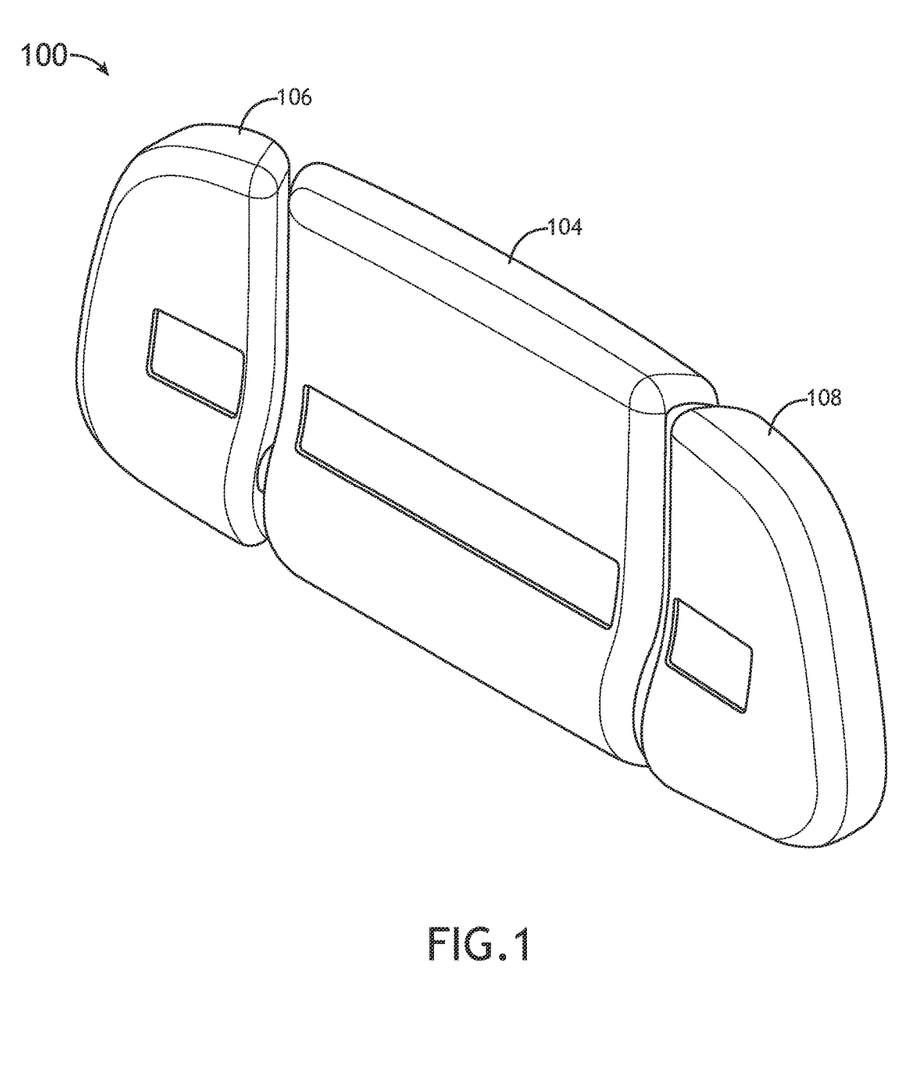
FIG. 1 is a front perspective view of a headrest assembly, in accordance with example embodiments of this disclosure.
Figure 2:
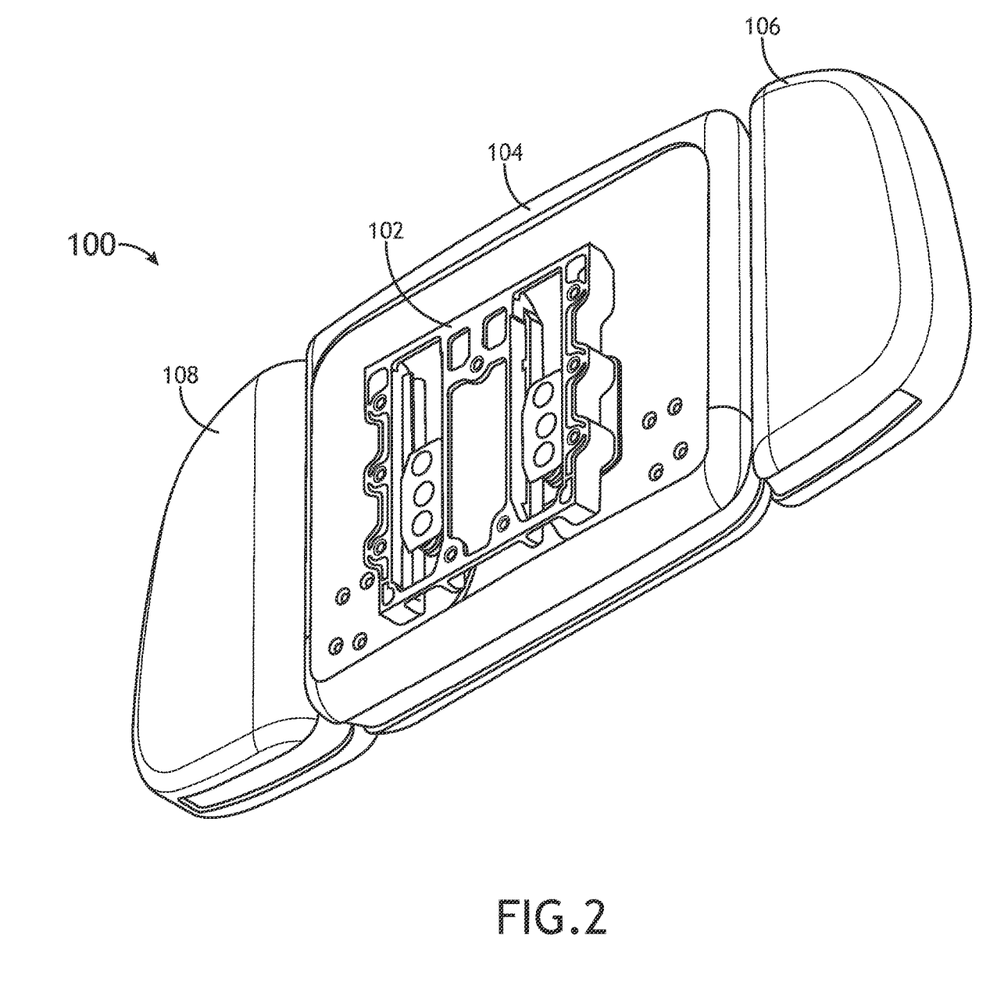
FIG. 2 is a rear perspective view of the headrest assembly shown in FIG. 1.
Figure 3:
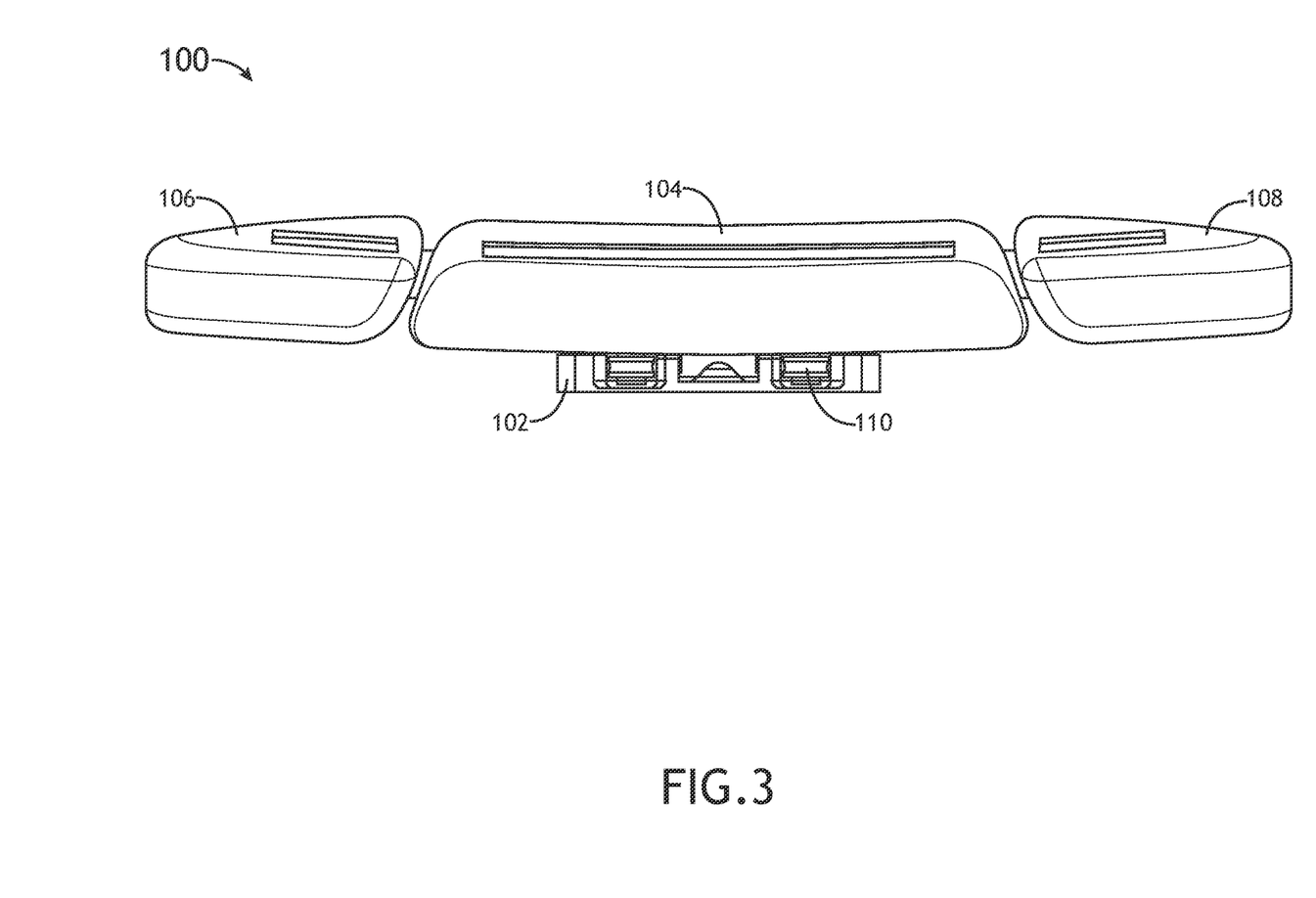
FIG. 3 is a top view of the headrest assembly shown in FIG. 1.
Figure 4:
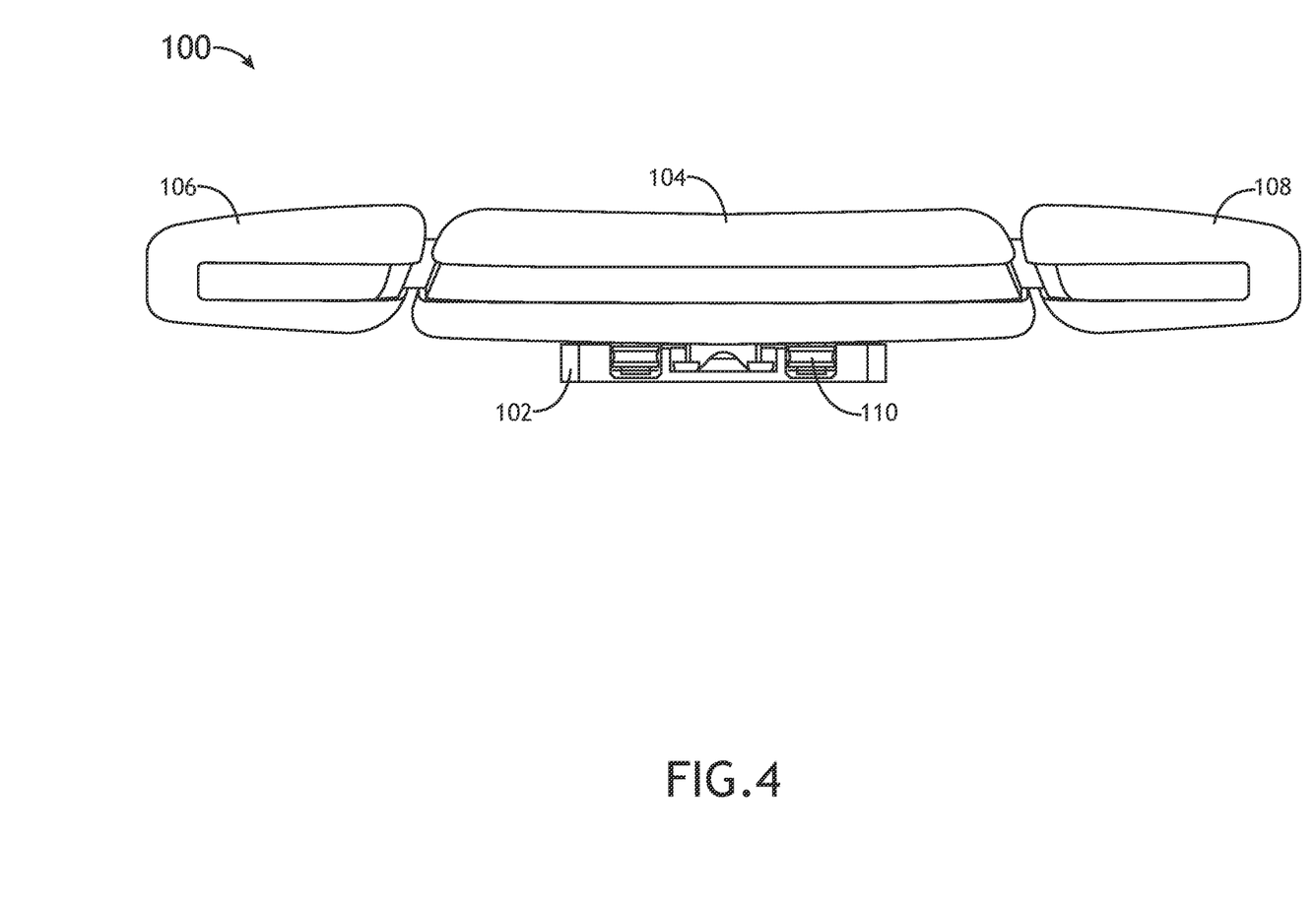
FIG. 4 is a bottom view of the headrest assembly shown in FIG. 1.
Figure 5:
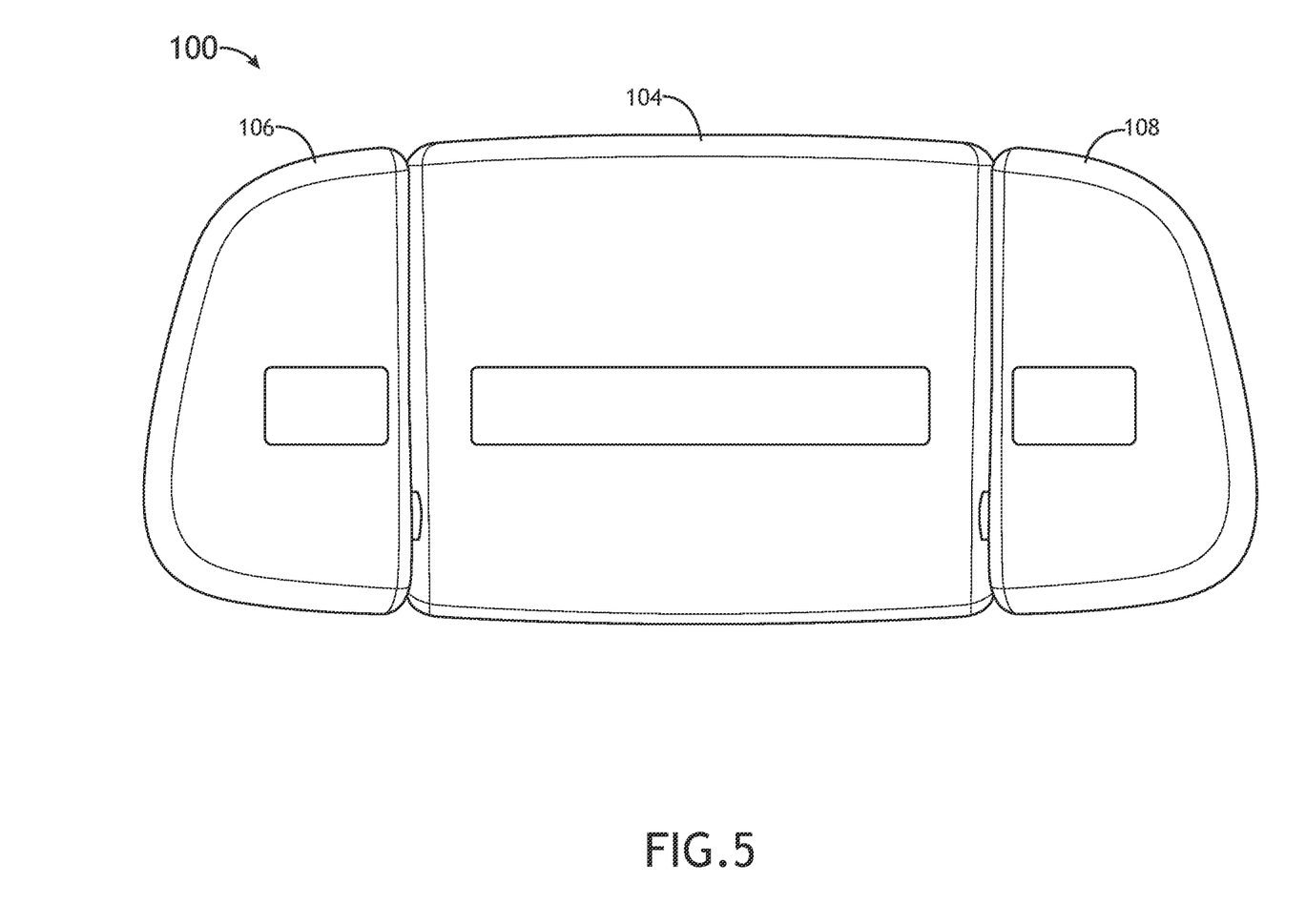
FIG. 5 is a front view of the headrest assembly shown in FIG. 1.
Figure 6:
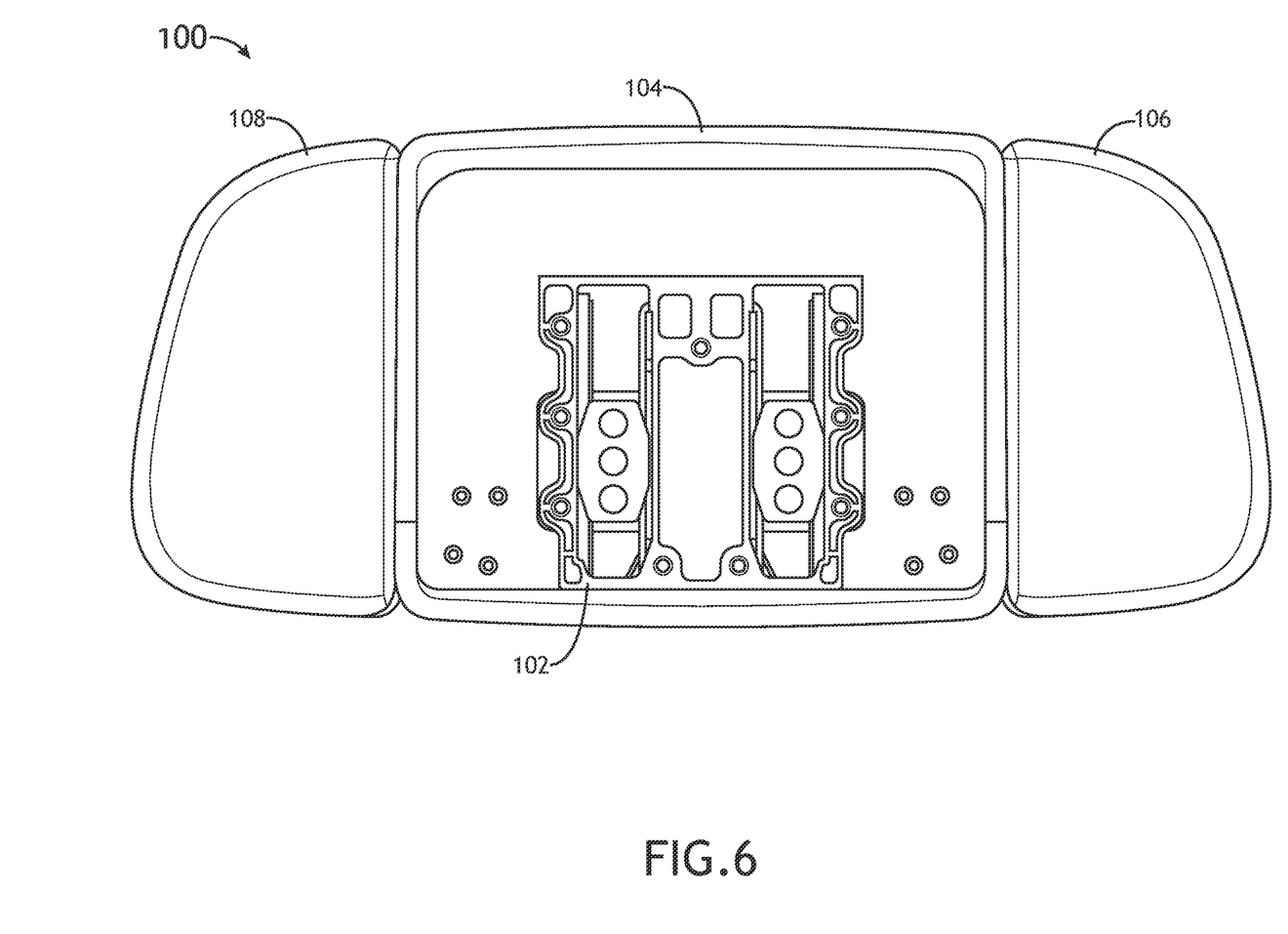
FIG. 6 is a back view of the headrest assembly shown in FIG. 1.
Figure 7:
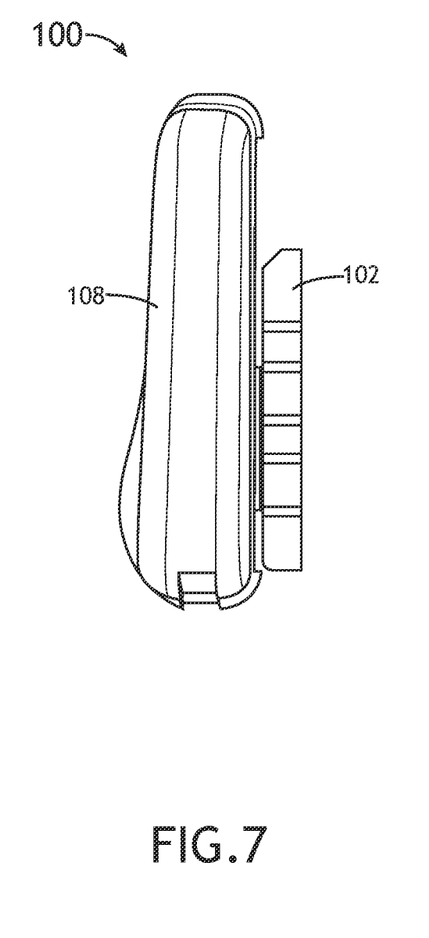
FIG. 7 is a right side view of the headrest assembly shown in FIG. 1.
Figure 8:
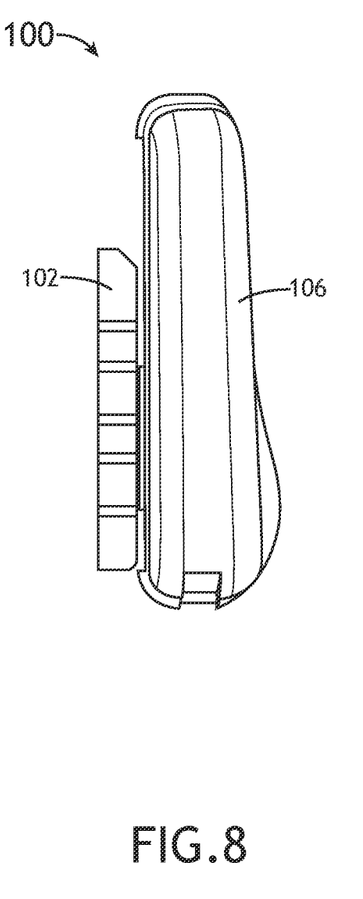
FIG. 8 is a left side view of the headrest assembly shown in FIG. 1.
Figure 9:
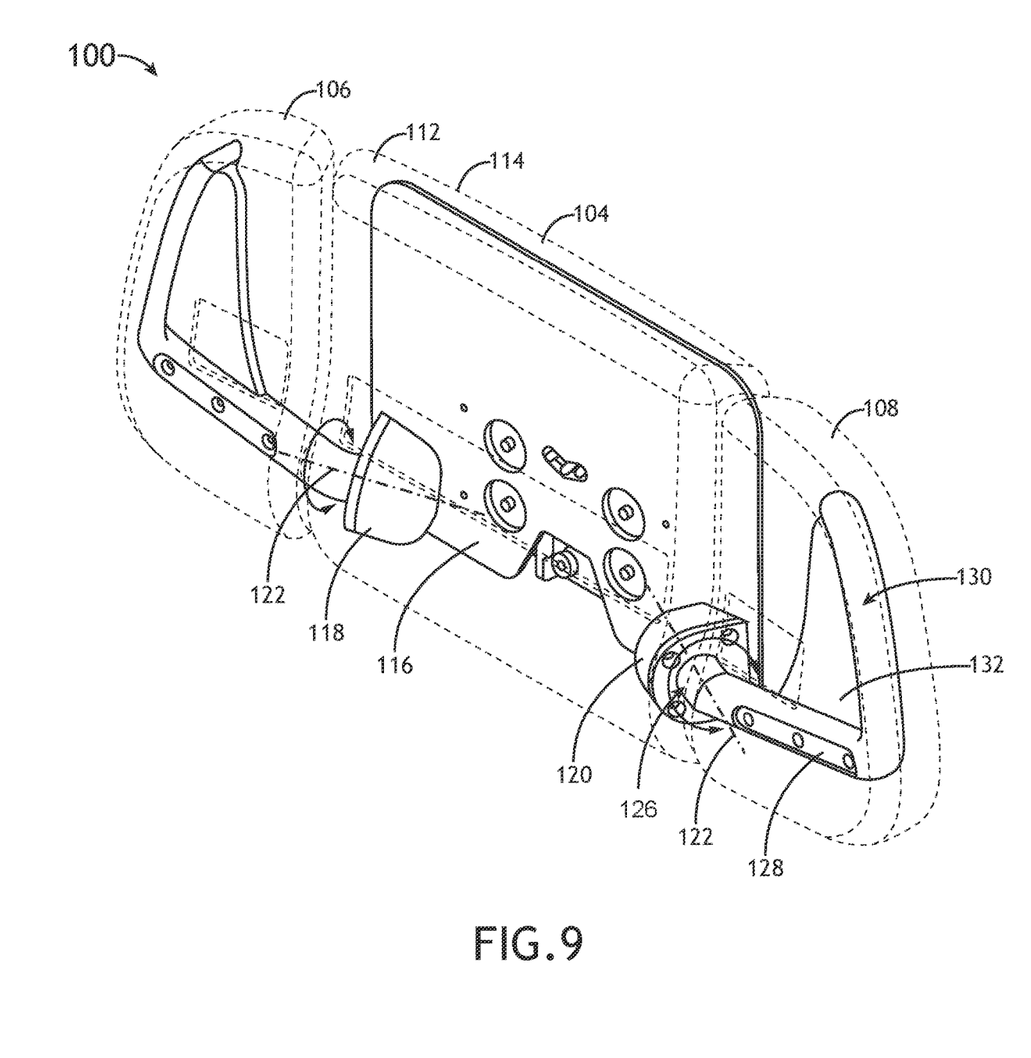
FIG. 9 is a front perspective view of the headrest assembly showing the cushion elements in transparency to illustrate the underlying subassemblies.

FIG. 9 illustrates the interconnection of the center portion 104 to each of the left ear 106 and the right ear 108. As shown in transparency, each of the center portion 104, the left ear 106, and the right ear 108 may include a cushion 112 disposed beneath a cover 114, for instance a dress cover. The cushion 112 and the dress cover 114 may be separate or integrally formed.

In embodiments, the center portion 104 generally includes a mounting plate 116 having a front defining a plane of the headrest assembly 100. In some embodiments, the plane may have a slightly positive angle or tilt for comfort and ergonomics. A left lateral receiver 118 is mounted proximal to a left lateral side of the mounting plate 116, and a right lateral receiver 120 is mounted proximal to a right lateral side of the mounting plate, as viewed looking into the front face of the mounting plate 116. The mounting plate and receiver configuration may be symmetrical about a vertical line drawn through the center of the mounting plate 116.

Each of the left and right lateral receivers 118, 120 opens substantially in a direction of its respective lateral side. Each of the left and right lateral receivers 118, 120 defines an axis of rotation 122 oblique to a plane of the center portion 104, for instance the plane defined by the front of the mounting plate 116. In embodiments, each of the left and right lateral receivers 116, 118 defines an axis of rotation 122 angled forward of the plane, for instance from about 5° to about 45°, and more preferably from about 10° to about 30°.

The left ear 106 includes a dogleg support 124 rotatably received in the left lateral receiver 118. In use, the dogleg support 124 is configured to rotate about the axis of rotation 122 defined by the left lateral receiver 118, between a stowed position in which the left ear 106 resides substantially in the plane of the center portion 104, and a deployed position in which the left ear 106 is oblique to the plane of the center portion 104. The right ear 108 is similar to the left ear 106 in that the right ear 108 also includes a dogleg support 124 rotatably received in the right lateral receiver 120. In use, the dogleg support 124 is configured to rotate about the axis of rotation 122 defined by the right lateral receiver 120, between a stowed position in which the right ear 108 resides substantially in the plane of the center portion 104, and a deployed position in which the right ear 108 is oblique to the plane of the center portion 104. In embodiments, the left ear 106 is configured to rotate independently of the right ear 108, and vice versa.

In embodiments, the rotating dogleg support 124 of each of the left ear 106 and the right ear 108 includes a first portion 126 for installation in the respective receiver 118, 120, a second portion 128 angled relative to the first portion 126, and a third portion 130 angled relative to the second portion 128. As shown, the angle between the first and second portion 126, 128 positions the respective ear substantially vertical when stowed and oblique to the plane of the center portion 104 when deployed. In some embodiments, each dogleg support 124 further includes a gusset 132 extending between the second portion 128 and the third portion 130. Each of the rotational couplings between the dogleg supports 124 and the receivers 118, 120 may be friction couplings such that the ear position can be held in any of the fully stowed, fully deployed, or intermediate positions of the ears.

In embodiments, the center portion 104 may be substantially rectangular, the left ear 106 may be tapered in a direction toward the 'top', and the right ear 108 may also be tapered in a direction toward the 'top', as shown in FIG. 9. FIG. 9 shows the positional relation between each of the center portion 104, the left ear 106, and the right ear 108 in the fully stowed condition of the headrest assembly 100.

Figure 10:
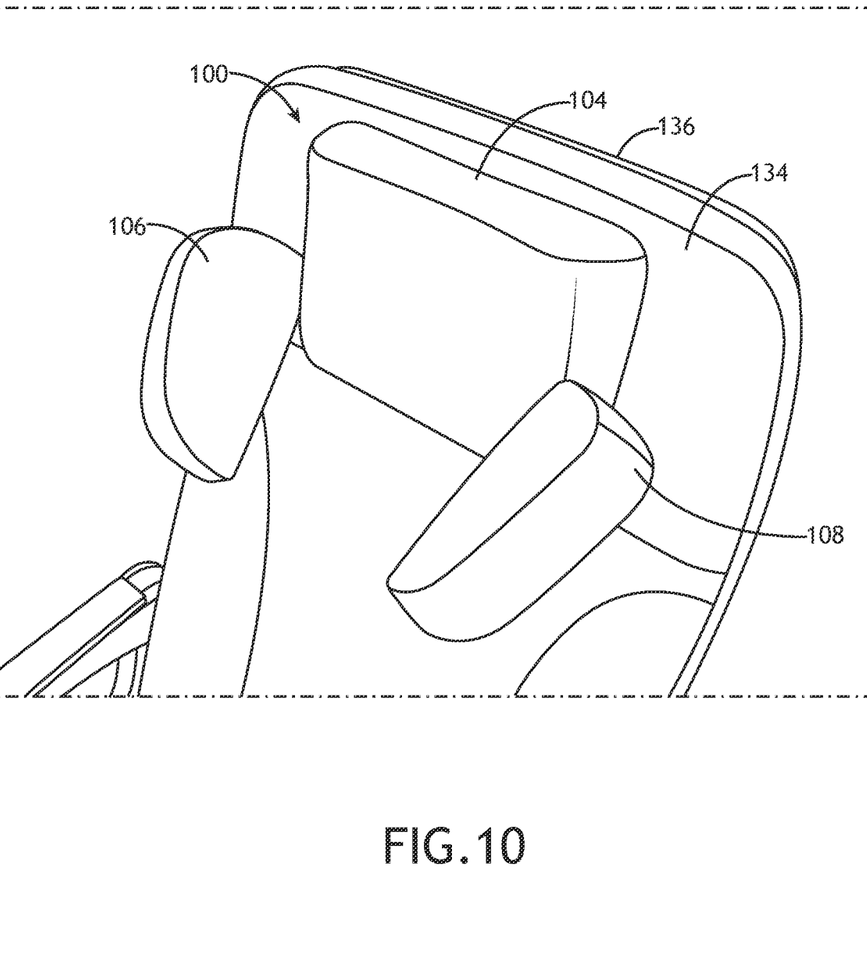
FIG. 10 illustrates the headrest assembly mounted to a passenger seat and with the left and right ears deployed.
Figure 11:
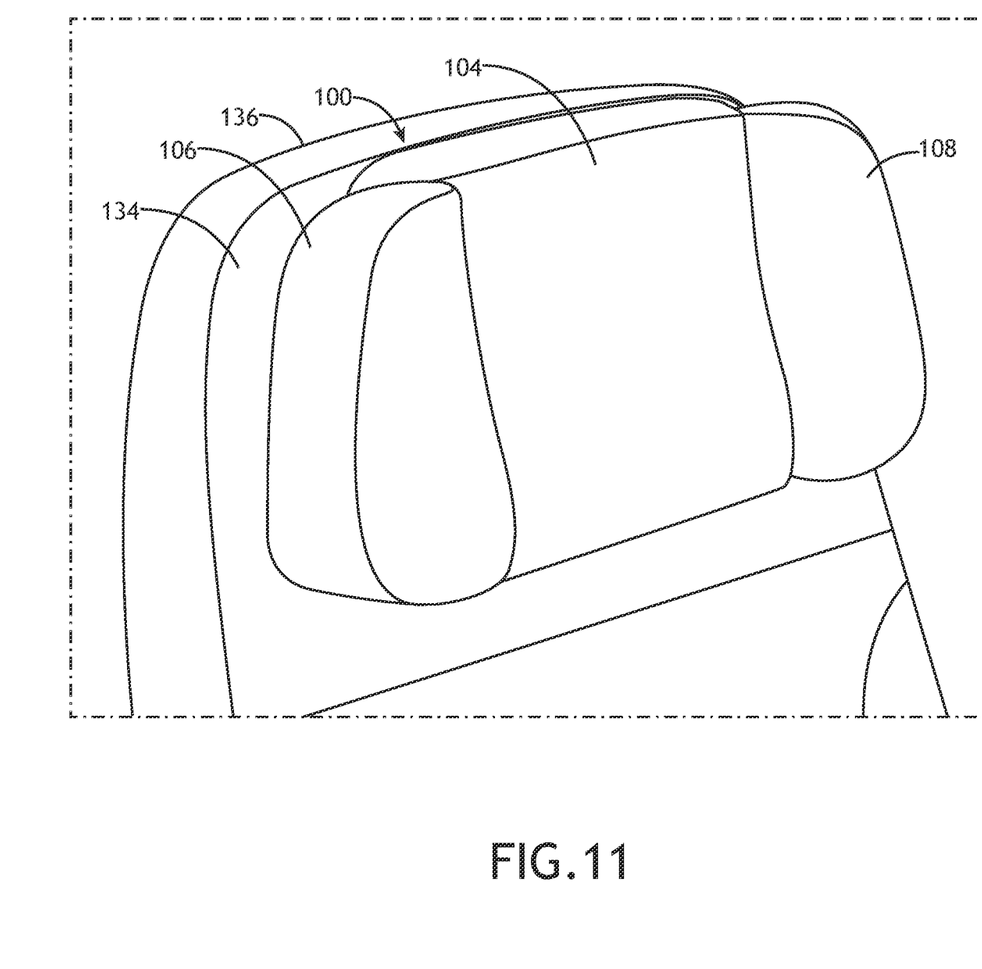
FIG. 11 illustrates the headrest assembly mounted to a passenger seat and with the left and right ears stowed.

FIG. 10 illustrates headrest assembly 100 mounted to the front of a backrest 134 of a passenger seat 136, for instance an aircraft passenger seat. FIG. 10 shows the left and right ears 106, 108 in their fully deployed condition in which both ears 106, 108 are oblique to the plane of the center portion and a portion of each ear 106, 108 is forward of the center portion 104. FIG. 11 shows the left and right ears 106, 108 in their fully stowed condition in which both ears 106, 108 reside substantially coplanar with the center portion 104. Comparing FIGS. 10 and 11, it is evident that the dogleg support causes the detached ends of the left and right ears 106, 108 to converge in a direction of the deployed position, and diverge in a direction of the stowed position. Such a rotation along an axis of rotation that is on an oblique plane to the center portion, as well as the seat, combined with the shaped dogleg support, moves the deployed ears into a position aligned with the sides of the passenger's head for enhanced support and comfort.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A headrest assembly, comprising:
a base mountable to a seat;
a center portion movably coupled to the base, the center portion including a left lateral receiver and a right lateral receiver, each of the left and right lateral receivers defining an axis of rotation oblique to a plane of the center portion;
a left ear including a dogleg support rotatably received in the left lateral receiver, the left ear configured to rotate about the axis of rotation of the left lateral receiver between a stowed position in which the left ear resides in the plane of the center portion, and a deployed position in which the left ear is oblique to the plane of the center portion; and
a right ear including a dogleg support rotatably received in the right lateral receiver, the right ear configured to rotate about the axis of rotation of the right lateral receiver between a stowed position in which the right ear resides in the plane of the center portion, and a deployed position in which the right ear is oblique to the plane of the center portion.

2. The headrest assembly according to claim 1, wherein the plane of the center portion is defined by a front of the center portion.

3. The headrest assembly according to claim 1, wherein:
the center portion is substantially rectangular;
the left ear is tapered; and
the right ear is tapered.

4. The headrest assembly according to claim 1, wherein the left and right ears converge in a direction of their deployed position and diverge in a direction of their stowed position.

5. The headrest assembly according to claim 1, wherein the left ear is configured to rotate independently of the right ear, and vice versa.

6. The headrest assembly according to claim 1, wherein the center portion comprises a mounting plate, and each of the left lateral receiver and the right lateral receiver are mounted to a front of the mounting plate.

7. The headrest assembly according to claim 1, wherein the dogleg support of each of the left ear and the right ear comprises a first portion, a second portion angled relative to the first portion, and a third portion angled relative to the second portion.

8. The headrest assembly according to claim 7, further comprising a gusset extending between the second portion and the third portion.

9. The headrest assembly according to claim 8, wherein each of the center portion, the left ear, and the right ear comprise a cushion and a cover.

10. An aircraft passenger seat assembly, comprising:
a passenger seat comprising a backrest; and
a headrest assembly, comprising:
   a base mountable to a front of the backrest;
   a center portion movably coupled to the base, the center portion including a left lateral receiver and a right lateral receiver, each of the left and right lateral receivers defining an axis of rotation oblique to a plane of the center portion;
   a left ear including a dogleg support rotatably received in the left lateral receiver, the left ear configured to rotate about the axis of rotation of the left lateral receiver between a stowed position in which the left ear resides in the plane of the center portion, and a deployed position in which the left ear is oblique to the plane of the center portion; and
   a right ear including a dogleg support rotatably received in the right lateral receiver, the right ear configured to rotate about the axis of rotation of the right lateral receiver between a stowed position in which the right ear resides in the plane of the center portion, and a deployed position in which the right ear is oblique to the plane of the center portion.

11. The aircraft passenger seat according to claim 10, wherein the plane of the center portion is defined by a front of the center portion.

12. The aircraft passenger seat according to claim 10, wherein:
the center portion is substantially rectangular;
the left ear is tapered; and
the right ear is tapered.

13. The aircraft passenger seat according to claim 10, wherein the left and right ears converge in a direction of their deployed position and diverge in a direction of their stowed position.

14. The aircraft passenger seat according to claim 10, wherein the left ear is configured to rotate independently of the right ear, and vice versa.

15. The aircraft passenger seat according to claim 10, wherein the center portion comprises a mounting plate, and each of the left lateral receiver and the right lateral receiver are mounted to a front of the mounting plate.

16. The aircraft passenger seat according to claim 10, wherein each of the center portion, the left ear, and the right ear comprise a cushion and a cover.

17. The aircraft passenger seat according to claim 10, wherein the dogleg support of each of the left ear and the right ear comprises a first portion, a second portion angled relative to the first portion, and a third portion angled relative to the second portion.

18. The aircraft passenger seat according to claim 17, further comprising a gusset extending between the second portion and the third portion.

19. A headrest assembly, comprising:
a center portion including a left lateral receiver and a right lateral receiver, each of the left and right lateral receivers defining an axis of rotation oblique to a plane defined by a front of the center portion;
a left ear including a dogleg support rotatably received in the left lateral receiver, the left ear configured to rotate about the axis of rotation of the left lateral receiver between a stowed position in which the left ear resides in the plane of the center portion, and a deployed position in which the left ear is oblique to the plane of the center portion; and
a right ear including a dogleg support rotatably received in the right lateral receiver, the right ear configured to rotate about the axis of rotation of the right lateral receiver between a stowed position in which the right ear resides in the plane of the center portion, and a deployed position in which the right ear is oblique to the plane of the center portion.

20. The headrest assembly according to claim 19, wherein, when each of the left ear and the right ear are in their respective stowed position:
a top of the left ear and a top of the right ear align with a top of the center portion; and
a bottom of the left ear and a bottom of the right ear align with a bottom of the center portion.

* * * * *